United States Patent [19]

Hujsak

[11] 4,298,178
[45] Nov. 3, 1981

[54] ROVING GEOSYNCHRONOUS ORBIT SATELLITE MAINTENANCE SYSTEM

[75] Inventor: Edward J. Hujsak, La Jolla, Calif.

[73] Assignee: General Dynamics, San Diego, Calif.

[21] Appl. No.: 111,113

[22] Filed: Jan. 10, 1980

[51] Int. Cl.³ .......................... B64G 1/00; B64G 1/64
[52] U.S. Cl. ................................ 244/158 R; 244/161; 414/223
[58] Field of Search ............... 244/158, 159, 161, 172, 244/169, 173; 414/146, 222, 223

[56] References Cited

U.S. PATENT DOCUMENTS 4,079,904  3/1978  Groskopfs et al. ................ 244/158

OTHER PUBLICATIONS

Deutsch et al., "Manipulator Systems Extend Man's Capabilites in Space", pp. 30-40, Astronautics & Aeronautics, Jun. 1972.

Primary Examiner—Charles E. Frankfort
Attorney, Agent, or Firm—John R. Duncan; Frank D. Gilliam

[57] ABSTRACT

A satellite maintenance system for satellite stations orbiting in the geosynchronous corridor comprising a roving satellite maintenance vehicle capable of operating autonomously in the geosynchronous corridor and containing replacement hardware in modular form by which maintenance operation can be made on the satellite station by the exchange of one module for another thereby repairing or upgrading the hardware in the satellite station to prolong its useful life. The maintenance vehicle is capable of operating in the corridor for prolonged periods of time in a standby mode and capable of proceeding, on command, to the satellite station to perform the maintenance function automatically.

4 Claims, 4 Drawing Figures

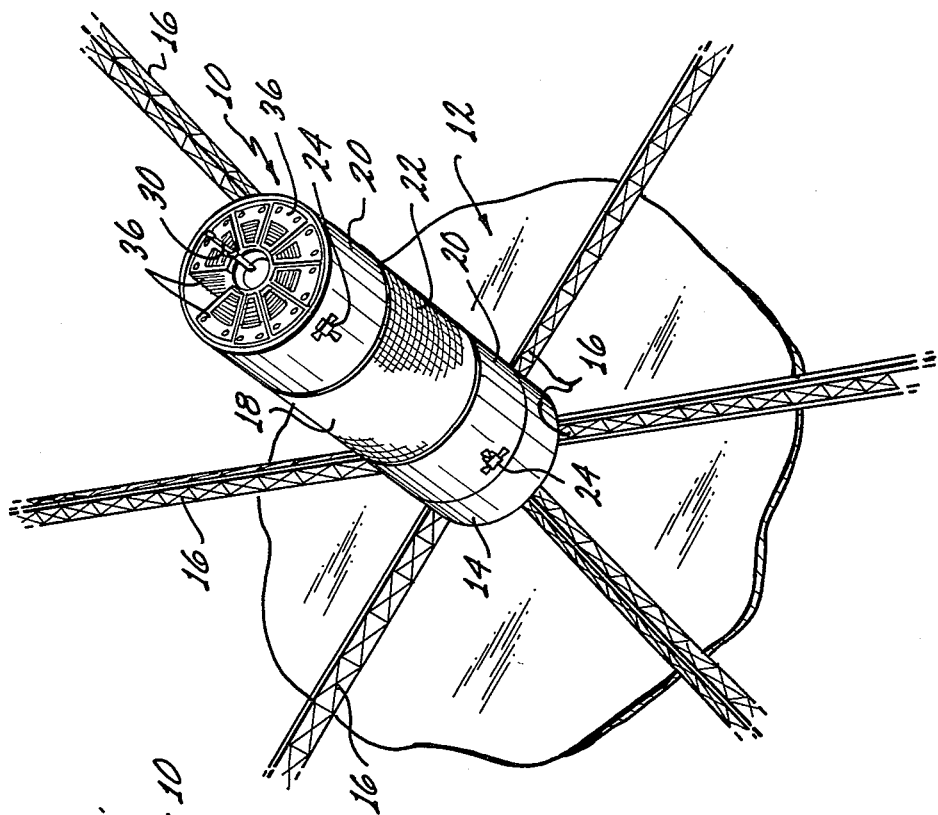
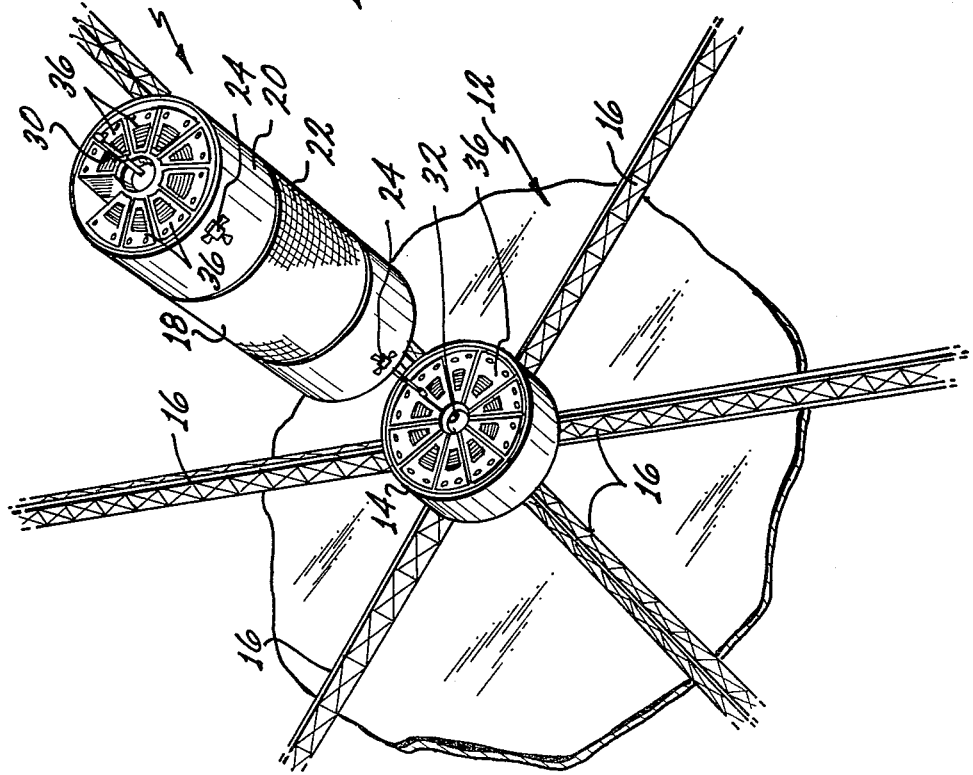

ROVING GEOSYNCHRONOUS ORBIT SATELLITE MAINTENANCE SYSTEM

BACKGROUND OF THE INVENTION

This invention relates, in general, to space satellites and vehicles and, specifically, this invention relates to systems for maintenance of space satellites.

The working life of space satellites, presently in orbit, is limited by the working life of their sub-systems. Future satellites stationed in the geosynchronous corridor, for example, commercial communication satellites, will be subject to growth along two paths; grown in physical size to accomodate the increase in communications traffic, and growth in lifetime to reduce the cost of the systems. Currently, satellite lifetime is about seven years and one aspect of the problem of increasing satellite lifetime to perhaps twenty years is to provide a means of replenishment of consumable and performing repairs on those sub-systems that are likely to experience failure. Further, since the communication field is one in which technological advances move very rapidly, provision must be made to replace outdated hardware in the satellite with new hardware.

The need for servicing satellites was recognized by the inventors, Groskopsf et al, to whom the U.S. Pat. No. 4,079,904 was issued on Mar. 21, 1978. However, the concept therein disclosed involved a man made shuttle orbitor operated by a technician located in the passenger compartment to entrap a satellite in its orbit and to locate the trapped satellite on an indexing platform located in the orbitor cargo bay where modules may be exchanged between the satellite and the module magazine in the orbiter.

Thus, the prior art envisioned a manned vehicle, a capture of the orbiting satellite to be serviced, and the release of the satellite after service back into orbit.

Accordingly, a primary object of this invention is to improve the prior art systems of satellite service by eliminating manned vehicles, the need for capturing a satellite to service the same, and the problems involved in such systems, such as servicing a communications satellite whose antennae may span several hundred feet.

SUMMARY OF THE INVENTION

The satellite maintenance system which accomplishes the foregoing object comprises a roving satellite maintenance vehicle capable of operating autonomously in the geosynchronous corridor yet containing replacement hardware in modular form by which maintenance operations can be made on a satellite in the geosynchronous orbit by the replacement of one module for another. The maintenance vehicle is capable of operating in the corridor for prolonged periods of time in a standby mode and capable of proceeding, on command, to the satellite station to perform the maintenance function automatically.

More specifically, the invention comprises a system wherein there is a physical and logic match which exists between the satellite and the maintenance vehicle. At each end of the maintenance vehicle are equipment slots, all but one of which contain maintenance hardware in modular form so that, upon berthing with the satellite, the module of hardware of the satellite to be replaced is first drawn into the empty slot in the maintenance vehicle following which new hardware is inserted in the satellite. The center of the maintenance vehicle is packaged with all of the avionics and other subsystems necessary for its operation and the exterior of the vehicle body is fitted with a solar belt for providing battery charging power, propulsion thrusters, rendevous and docking sensors, and berthing devices.

Thus, it is clear that another object of this invention is to provide a system that can accomplish the function of satellite maintenance, being capable of operating autonomously in the geosynchronous corridor for prolonged periods in a standby mode and capable of proceeding on command to a satellite station to perform a maintenance function automatically.

BRIEF DESCRIPTION OF THE DRAWINGS

FIG. 3 shows the maintenance vehicle about to be berthed in a satellite station, and, FIG. 4 shows the maintenance vehicle connected to the satellite for the maintenance operation.

BRIEF DESCRIPTION OF THE PREFERRED EMBODIMENT

Figure 1:
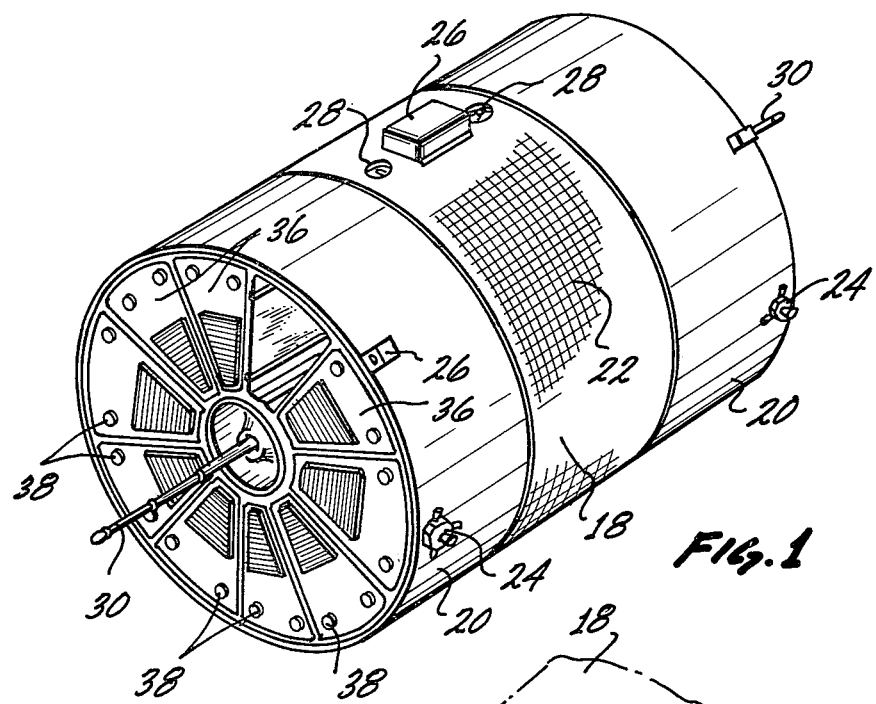
FIG. 1 is a perspective view of the maintenance vehicle constructed in accordance with the teachings of this invention.
Figure 2:
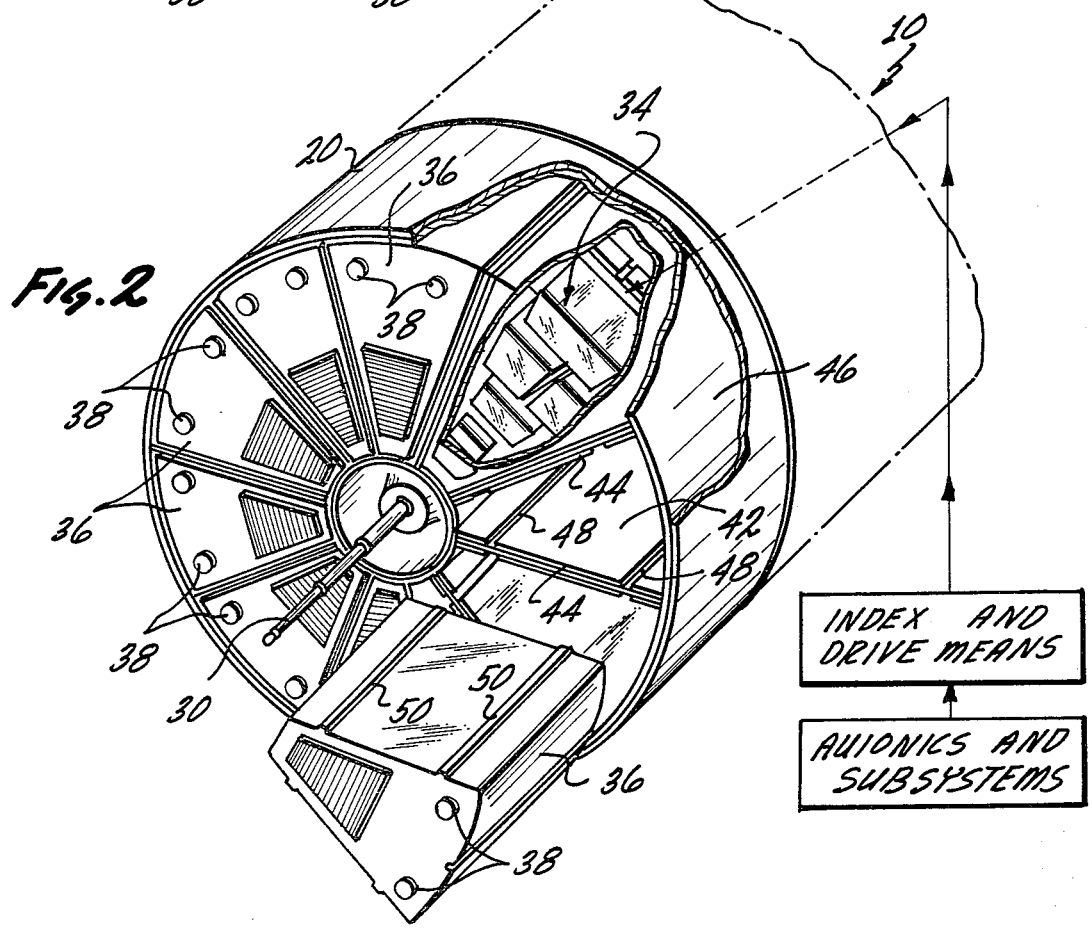
FIG. 2 is a perspective view of the portion of the maintenance vehicle, enlarged over FIG. 1 and partially broken away to show their modules and the relationship to the vehicle.

In the drawings, there is shown a roving maintenance space vehicle 10, FIGS. 1 and 2, capable of berthing with an orbiting satellite station 12, FIGS. 3 and 4. Shown as an example, is a communications satellite station with a center section 14 from which radiate a plurality of antennae 16. The center section 14 contains all hardware and subsystems in modular form necessary for the satellite station to accomplish its purpose.

This maintenance vehicle 10 is completely autonomous and capable of operating in a geosynchronous corridor for a prolonged period of time, in a standby mode, yet capable of proceeding on command to a satellite station 12 to perform a maintenance function on the satellite automatically.

To accomplish this automatic maintenance function, the maintenance vehicle 10 is preferably of cylindrical configuration, corresponding in diameter with the diameter of the center section 14 of the satellite station so that not only is there a physical but also a logic match between the maintenance vehicle and the station.

The maintenance vehicle is divided into three sections; a center section 18 and two end sections 20. The center section 18 comprises the system equipment bay for the operation of the maintenance vehicle and in which is packaged all of the avionics and other subsystems necessary for its operation. Shown surrounding this central section 18 on its exterior is a belt 22 of solar cells to provide battery charging power for the avionics and subsystems and elsewhere on the exterior of the vehicle are propulsion thrusters 24, rendevous and docking sensors 26 and the star pointers 28; all connected, of course, into the avionics and subsystems in the center section 18. On the central axis of the vehicle and protruding from each end are berthing probes 30, the mating part 32 of which is located in the satellite station, centrally of the center section 14.

Within each end of the end sections 20 is an arrangement of replacement hardware, identified as 34, within modules 36. In the embodiment illustrated, the modules 36 are truncated, six sided (counting the apex), sealed packages with suitable connectors, such as 38, for connecting the hardware into the center section 14 of the satellite station 12. The modules are configured to fill similarly shaped equipment slots 42, which are defined by walls 44 located on the radius lines of the vehicle and forming part of a circular cradle 46, or carriage, rotatable about the center axis of the maintenance vehicle. The walls of the cradle 46 contain coaxial slots 48 for receiving complementary mating slides 50 located on the outside walls of the modules 36. In operation, all of the equipment slots of the vehicle at each end are filled with modules, except one slot, so that in a maintenance operation, the module to be replaced, is first drawn from the satellite station into the empty vehicle slot following which a new module is inserted into the satellite station.

Suitable indexing and drive means are provided in the maintenance vehicle to rotate the cradles, to retain the modules in their respective slots during standby operation, to withdraw the modules to be replaced from the satellite station, and to eject a new module into the satellite station. Since such indexing and drive means can be selected from any number of such mechanical and electrical types by those skilled in the art no further description is deemed necessary. The satellite station 12 with modules 36 therein are shown in a complementary cradle in FIG. 3, however, this latter cradle need not be rotatable. Likewise, the slots in the maintenance vehicle which are filled and the slot which is empty is shown clearly in FIGS. 1, 3 and 4. Note also at this time that the use of both ends of the vehicle for modules maximizes the capacity of the vehicle.

In operation, the system works as follows. On command from a ground station, the maintenance vehicle 10 is directed to proceed to a certain orbiting station 12. Using its own sensor system, the maintenance vehicle 10 proceeds to the station and initiates automatic rendevous and closing (berthing) with the satellite. This is shown in FIG. 3 where the maintenance vehicle is nearing the orbiting satellite and in FIG. 4 where the maintenance vehicle is berthed with the satellite. Either by command, or through interrogation logic, the module to be replace is identified. The robotics interior of the maintenance vehicle 10, as described above, causes rotation of the module cradle 46 to a position where the empty slot is oriented over the module in the satellite to be replaced. The module is withdrawn from the satellite into the empty slot and the cradle rotates again to orient the replacement module to the position where a new module is to be inserted. When inserted and when the checks are complete, the maintenance vehicle disengages and reverts to its roving mode. When the modular parts are expended, the maintenance vehicle can be returned to a low earth orbit for refurbishment and refill.

What is claimed is:

1. A system for servicing orbiting satellite stations comprising,
   a maintenance vehicle capable of orbiting in the geosynchronous corridor and having means for rendezvousing and berthing with said satellite on command from another source,
   means in said vehicle for replacing parts of said satellite with parts from said vehicle when said vehicle is berthed with said satellite for repair and maintenance of said satellite, said parts of said orbiting satellite are operating hardware packed in modules similar to the module in said orbiting satellite, and
   a rotatable circular cradle with said modules located in said cradle, said vehicle further including means for positioning an empty position in said cradle adjacent said orbiting satellite for removing a module to be replaced and rotating said cradle so that a module is juxtaposed the now empty position in the satellite and for ejecting a new module into said satellite.

2. The system as claimed in claim 1 wherein said modules in said cradle are located at each end of said maintenance vehicle.

3. The system as claimed in claim 1 wherein said maintenance vehicle is cylindrical in configuration and in three sections,
   one of such sections being central of two end sections and containing the hardware and subsystems necessary for operation of said vehicle,
   said two end sections containing hardware packaged in modules,
   cradle means in said end sections having equipment slots in which said modules are located
   all of said equipment slots but one being filled with said modules, and
   indexing and drive means for retaining said modules in said slots, for rotating said cradle, for receiving the modules to be replaced from said satellite, and for ejecting a module from said vehicle into said satellite.

4. A system for servicing an orbiting satellite station having a central section with its hardware for performing its function in orbit all in modules,
   a cylindrical maintenance vehicle capable of orbiting in the geosynchronous corridor and having means for rendevous and berthing with said satellite on command, the configuration of said maintenance vehicle being compatable with the central section of said satellite station,
   a circular cradle means located at each end of said maintenance vehicle and containing modules identical in configuration to the modules in the satellite station,
   said cradle being rotatable about the central axis of said maintenance vehicle and containing equipment in all but one such equipment slot, and
   means for positioning the empty equipment slot in said cradle adjacent the module to be replaced in said satellite, for removing said module to be replaced into said empty equipment slot, indexing said cradle so that the replacement module is juxtaposed the now empty position in said satellite, and for ejecting the replacement module into said satellite, whereby said maintenance vehicle is then disconnected from said satellite station and returned to its own orbit.

* * * * *